United States Patent [19]
Earl et al.

[11] Patent Number: 5,231,663
[45] Date of Patent: Jul. 27, 1993

[54] IMAGE PROCESSING SYSTEM

[76] Inventors: Joseph G. Earl, 5100 Covington St., Greenwood; Michael D. Moffitt, 5570 Covingting Rd., Shorewood, both of Minn. 55331

[21] Appl. No.: 670,715

[22] Filed: Mar. 18, 1991

[51] Int. Cl.⁵ .......................... H04N 1/00; H04N 1/44
[52] U.S. Cl. .................................... 380/18; 380/23; 380/49; 380/50; 382/10; 358/406; 358/426; 358/448; 358/467
[58] Field of Search ............ 340/825.31, 825.34; 382/2, 10; 358/406, 426, 448, 467; 379/100

[56] References Cited

U.S. PATENT DOCUMENTS

| | | | |
|---|---|---|---|
| 3,859,515 | 1/1975 | Radcliffe, Jr. | 340/825.34 X |
| 3,887,765 | 6/1975 | Marahse et al. | 358/409 |
| 3,905,018 | 9/1975 | Gray | 382/34 |
| 4,091,423 | 5/1978 | Branscome | 380/18 |
| 4,100,604 | 7/1978 | Perreault | 364/827 |
| 4,106,103 | 8/1978 | Perreault | 364/827 |
| 4,187,392 | 2/1980 | Safford | 380/44 |
| 4,296,441 | 10/1981 | Ogasawara | 358/483 |
| 4,571,699 | 2/1986 | Herzog et al. | 395/200 |
| 4,620,233 | 10/1986 | Ogawa et al. | 358/433 |
| 4,633,507 | 12/1986 | Cannistra et al. | 382/61 |
| 4,774,665 | 9/1988 | Webb | 364/409 |
| 4,821,034 | 4/1989 | Anderson et al. | 340/825 |
| 4,893,333 | 1/1990 | Baran et al. | 379/100 |
| 4,941,170 | 7/1990 | Herbst | 379/100 |
| 4,944,031 | 7/1990 | Yoshino et al. | 355/206 |
| 5,012,522 | 4/1991 | Lambert | 382/2 |

OTHER PUBLICATIONS

Knight et al., *Rapid and Accurate Personnel Identification System;* Dept. of the Air Force, Report BMO TR-85-37; Jun. 1, 1985.

*Primary Examiner*—Bernarr E. Gregory
*Attorney, Agent, or Firm*—Robert A. Brown

[57] ABSTRACT

An image processing system receives a series of pixel elements representative of a scanned image. The system converts the pixel elements into a vector representation of the scanned image. The vector representation of the scanned image is compared with known vector representations. Based upon this comparison, the image processing system performs various functions such as providing an output or controlling the system. The image processing system may be used for mark sense recognition in which mark information is decoded from learned forms based upon a key. An output is provided based upon a comparison between the marks and the key.

19 Claims, 8 Drawing Sheets

| X | Y |
|---|---|
| 2 | 5 |
| 2 | 4 |
| 3 | 3 |
| 4 | 2 |
| 5 | 1 |
| 6 | 2 |
| 7 | 3 |
| 8 | 4 |
| 8 | 5 |

IMAGE PROCESSING SYSTEM

BACKGROUND OF THE INVENTION

The present invention relates to image processing. In particular, the present invention relates to an image processing system based upon a vector representation of an image.

An image processing system is a system in which specific features of an image can be identified and acted upon. Typically, an image is entered into the system using an image scanner. The image scanner provides an output which comprises a digital representation of pixel elements. Pixel elements are representations of intensity of discrete portions of the scanned image. A pixel may indicate whether a discrete portion of the scanned image has an intensity which is greater than or less than a threshold level. In this case, the pixel representation of the image will be a plurality of dots in which the dots are either black or white. Pixels may also represent gray scale or color of the image.

Image processing has become increasingly important in recent years. Much modern technology uses images as a source of information for interpretation and analysis. Images may be from satellites, x-rays, microscopes, flat bed scanners and facsimile machines. The proliferation of these image sources has created a need for image processing that can rapidly, accurately and cost effectively extract information contained in images.

Computers can process scanned images and perform various types of interpretation and analysis. These include image enhancement, distortion correction and pattern recognition. Image processing can be used in production testing and quality control, robotics and other activities where it is desirable to rapidly and cost effectively extract useful information from scanned images. For example, image processing can be used for optical mark recognition such as described in U.S. Pat. No. 4,571,699. In such a system, a marked answer sheet such as those used in standardized tests is scanned into an image processing system which processes the results and identifies the number of correct answers.

Typically, image processing systems operate on individual pixel elements or strings of adjacent pixel elements to analyze the image.

There is a continuing need to improve the speed, accuracy and capabilities of image processing systems.

SUMMARY OF THE INVENTION

The present invention is a novel image processing system in which a scanned image can be input, interpreted and acted upon. The present invention provides improved accuracy and additional capability over prior art systems without compromising processing speed.

In the present invention, an image scanner provides a scanned image. The scanned image is related to a string of pixel elements whose combination is representative of an actual image. In accordance with the present invention, the scanned image is converted into a vector representation of the image. The vector representation is interpreted and analyzed by the image processing system and an output is provided. For example, the vector representation can be compared with known vector representations and an output can be provided based upon this comparison.

A vector representation can comprise vectors of any number of various shapes. For example, in one embodiment of the present invention, a vector representation of an image may include lines, rectangles and conic sections.

By processing a vector rather than a bit map representation of a scanned image, the present invention provides improved capabilities over prior art image recognition systems. For example, one embodiment of the present invention provides an improved mark sense recognition system for scoring marked answer sheets. This system includes a number of processing steps. These include a "learn form" step in which the system stores the characteristics of a blank form; a "build key" step in which an answer is entered into the system; and a "score" process in which marked forms are compared with the key based upon the learned form. The score results may then be provided to a user or sent to a subscriber station. In this embodiment, a facsimile machine connected to a computer system provides a suitable image scanning device.

DETAILED DESCRIPTION OF THE PREFERRED EMBODIMENTS

Figure 1:
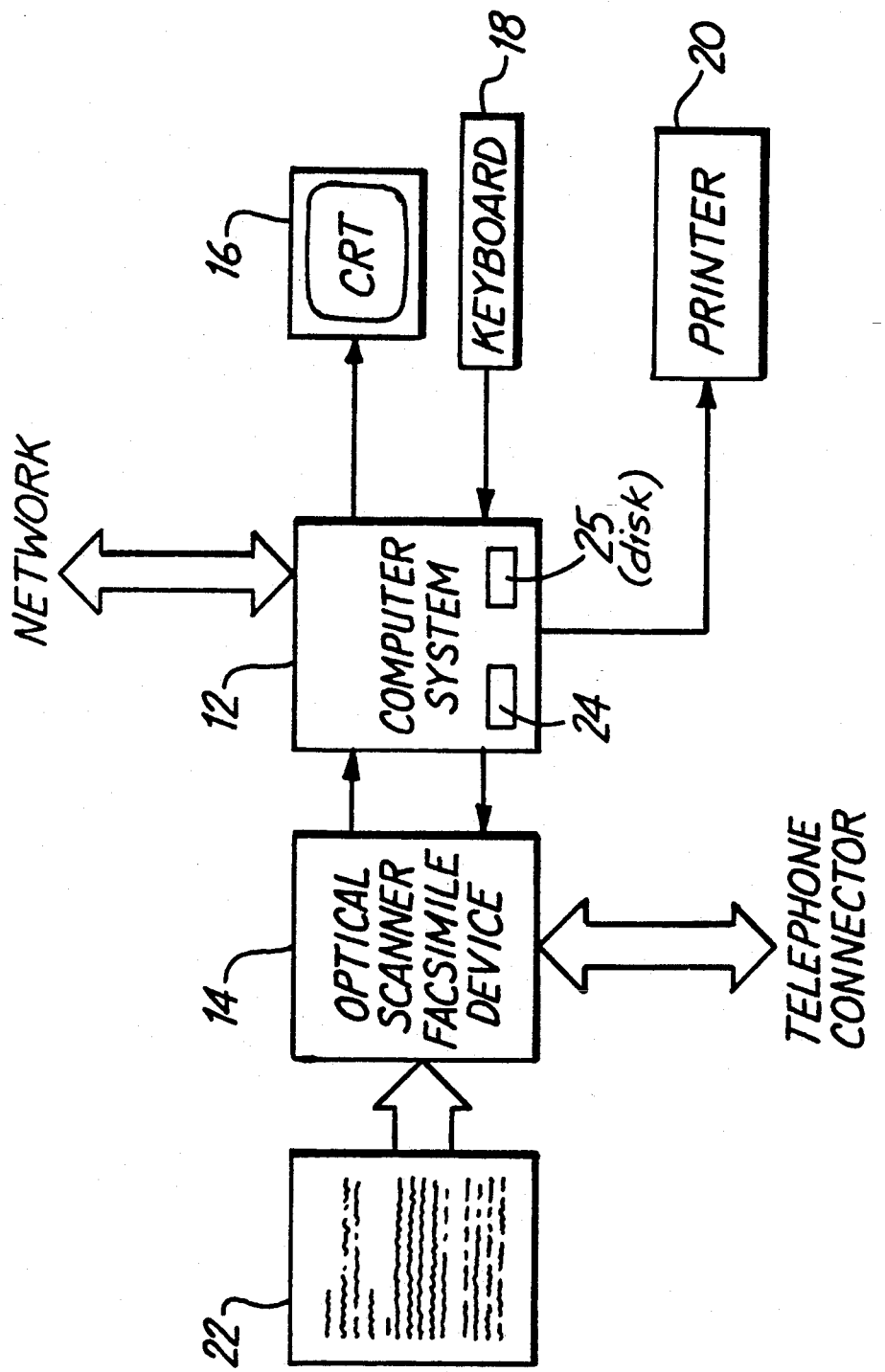
FIG. 1 is a block diagram of an image scanning system in accordance with the present invention.

FIG. 1 shows a block diagram of an image processing system 10 in accordance with the present invention. Image processing system 10 includes a computer system 12 which is connected to an optical scanner-facsimile device 14, a CRT display 16, a keyboard 18 and a printer 20. Computer system 12 includes an internal memory 24 and a magnetic storage disk 25. Scanner-facsimile device 14 is situated to scan an image on a form 22. Optical scanner-facsimile device 14 is also coupled to a communication link such as a telephone line.

Computer system 12 receives an image input from optical scanner-facsimile device 14. Images may be from two sources: scanned by scanner 14 or received over the telephone connection. Computer system 12 generates a vector representation of the scanned image, in accordance with the present invention. The vector representation is analyzed by computer 12. Results from the analysis can be displayed on CRT 16, printed on printer 20 or output over the telephone connection. Keyboard 18 is used by an operator to control system 10.

The present invention is capable of mark scoring documents. Previously, mark scoring used specially designed optical mark scanners which detected high density marks through optical interference/absorption which was manifest in the scanner output. These systems are costly, slow and inflexible, requiring highly accurate forms.

The present invention is well suited for mark sensing using a standard facsimile machine. For example, an image is scanned and converted to a conventional format (such as CCITT Group 3, Group 4, etc.) which is supplied to computer system 12.

Image processing system 10 performs a number of processing steps. These steps include facsimile receipt, facsimile decoding/interpretation, sender recognition-/interpretation, processing and result reporting.

During facsimile receipt, facsimile data is received by computer system 12. This may include a decryption step if the data is encrypted. The facsimile data is stored in memory 24 or on disk 25 of computer system 12.

Figure 2:
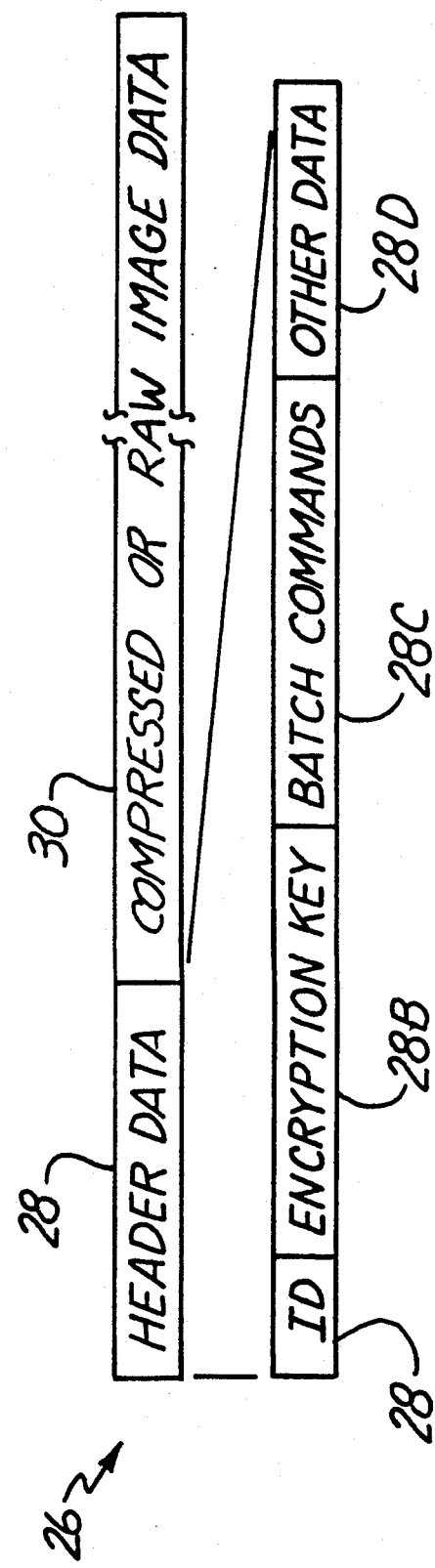
FIG. 2 is a schematic diagram of data received for use with the present invention.

After the facsimile is received, computer system 12 decodes the data stream. The facsimile includes a header which carries sender identification, batch instructions and other information. The header may also include a public encryption key if the facsimile is sent in an encrypted format. FIG. 2 shows a schematic diagram of a facsimile transmission 26. Each facsimile transmission 26 includes header data 28 and image data 30. Image data 30 may be either a compressed or raw image data. Header data 28 includes sender identification 28A, public encryption key 28B, batch commands 28C and other data 28D. Batch commands 28C are used to control computer system 12 during operation of image processing system 10.

Figure 3:
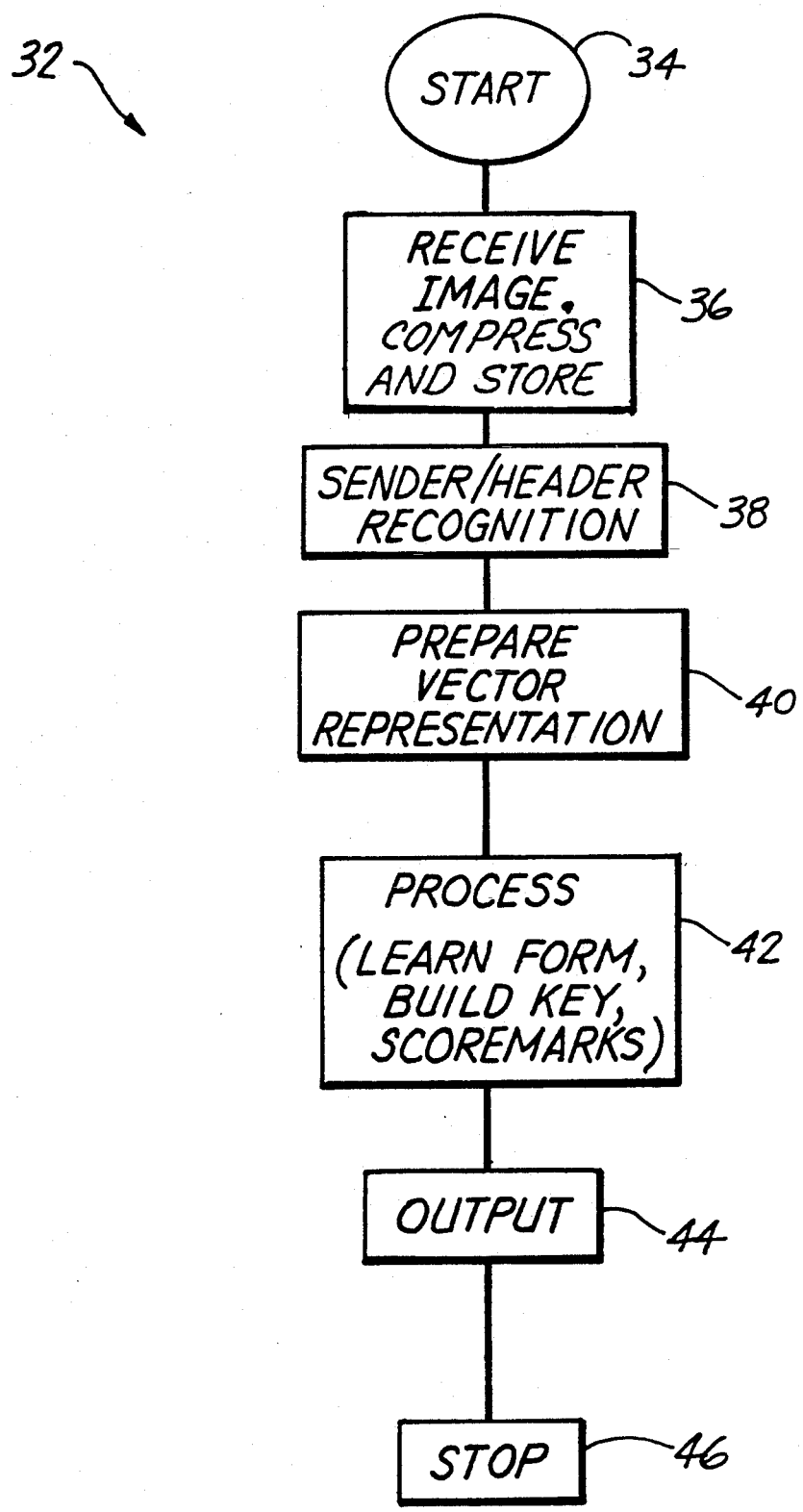
FIG. 3 is a flow chart showing steps in accordance with the present invention.

FIG. 3 is a block diagram 32 of operation of image processing system 10. The process starts at block 34 and a bit map image is received at block 36. The image is stored in memory in a compressed format. At block 38, the system 10 decodes header data 28 from a transmission and identifies the sender of the transmission. A vector representation of the scanned image is prepared at block 40 in FIG. 3. The vector representation is derived by converting a bit map image into its vector components, in accordance with the present invention. The operation of this vector conversion process is described below in more detail. The vector representation is stored in memory 24.

At block 42 in FIG. 3, the vector representation stored in memory 24 is processed. The process may be a "learn form", a "build key" or a "score mark" process. In the "learn form" process, a blank form is input to the system and its format is learned for later recognition. During the "build key" process, an answer key is learned and the key is associated with a previously learned form. During the "score mark" process, marked forms in the form of a mark matrix are compared with the key and the learned form. The comparison indicates the number of correct answers on the answer form. At block 44, results of the process are output. The results can be displayed on CRT 16, printed on printer 20 or sent to a remote facsimile device by facsimile device 14 over the telephone connection. The process is terminated at block 46.

The computer 12 exists in essentially two states: a wait state in which the central processor is servicing requests from the facsimile device 14 for input/output services, and an active process state in which a central processor in computer 12 is providing services to the various interrogation, interpretation, and support subsystems. In some computer systems, the facsimile processing units are able to operate in a multi-tasking state with other related or unrelated processes.

Security of transmitted data may be maintained through the use of an RSA-like encrypt/decrypt process whereby a sender and a receiver each have unique keys. In this way, the receiver has a key for each sender, and that key alone is able to facilitate decoding of the transmitted data by the receiver.

At the point of receiving the header information, the system is able to derive whether or not the body of the transmission will be encrypted, and if so, using what method. Furthermore, the sender is also able to specify whether or not return data is to be encrypted.

During facsimile receipt, facsimile data is received and temporarily stored for processing, either resident in random access memory (RAM) 24 or compressed for storage on disk 25 as an open file. The file is maintained in an open state so that if input processing is temporarily interrupted, the data file will not be closed and therefore not available. This process is facilitated by a device driver working in concert with an external processor responsible for managing the communications session with the sending facsimile device. The received data is processed according to parameters stored in a Parameter Queue or according to baseline default parameters to facilitate processing of headers, etc.

FIGS. 4A through 4D show a detailed flow chart 48 which includes subsystems of computer 12 in accordance with the present invention. The flow chart 48 interacts with facsimile device 14 shown in FIG. 1 through an interface 50. Interface 50 provides incoming images to Receive Marked Images subsystem 52 and provides header information to Process Header Request subsystem 54. Process Header Request subsystem 54 is coupled to a database 56 which contains valid forms, a database 58 which contains a list of valid users, a database 60 which contains a list of valid header formats. Activities which are requested by the header are stored by Process Header Request subsystem 54 in a database 62 which contains a list of activities requested. Process requests and batch instructions are passed by Process Header Request 54 to a parameter queue database 64.

Processing parameters are passed from parameter queue database 64 to Receive Marked Images subsystem 52 to control initial processing of received images. Received Marked Images subsystem 52 provides image data to Decrypt Transmittals subsystem 66 (FIG. 4C) which decrypts the image data if the image was transmitted in an encrypted format. Decrypt Transmittals subsystem 66 receives process parameters such as public and private keys from the parameter queue database 64. Subsystem 66 passes the image data to interpret Marked Images subsystem 68. Interpret Marked Images subsystem 68 also receives process parameters from parameter queue database 64. Interpret Marked Images subsystem 68 receives form coordinates from a form coordinate database 70. The form coordinates are used to identify locations of marked information. Interpret Marked Images subsystem 68 identifies mark data which is placed in mark data database 72.

A Build Keys subsystem 74 (FIG. 4D) receives mark data from mark data database 72. Build Keys subsystem 74 also receives parameter information from parameter queue 64. For accounting purposes, Build Keys subsystem 74 provides accounting information to activity database 62. Build Keys subsystem 74 also generates score keys information which is stored in a score keys database 76.

A Learn Form subsystem 78 receives mark data from mark data database 72 and process parameters from parameter queue database 64. Learn Form subsystem 78 places form coordinates in form coordinate database 70. Additionally, Learn Form subsystem 78 places activity information in activity database 62 for accounting purposes.

A Score Marks subsystem 80 (FIG. 4B) receives mark data information from mark data database 72 and score keys information from score keys database 76.

Score Marks subsystem 80 provides a scores output to a scores database 82 and an activity output to activity database 62.

A Build and Transmit Score Reports subsystem 84 takes score information from scores database 82 and builds score reports which are provided to facsimile 14 through interface 50. Activities of Build and Transmit Score Reports subsystem 84 are placed in activity database 62.

Invoice data is placed in invoice database 86 (FIGS. 4C and 4B) based upon information in parameter queue 64 and activity database 62 by a Create Unbilled Activity subsystem 88 and a Create Invoice Data subsystem 90. Unbilled Activity is stored in an unbilled activity database 92. Bills are sent to remote subscribers through facsimile 14 by Send Billings subsystem 94 (FIG. 4C) through interface 50. Billings are generated by a Generate Billings subsystem 96 in conjunction with invoice data database 86. Generate Billings subsystem 96 places billing statements in a statement database 98 and invoices in an invoice database 100. Accounts receivable are maintained in an accounts receivable database 102 (FIG. 4D) by a Load Accounts Receivable subsystem 104.

Figure 4A:
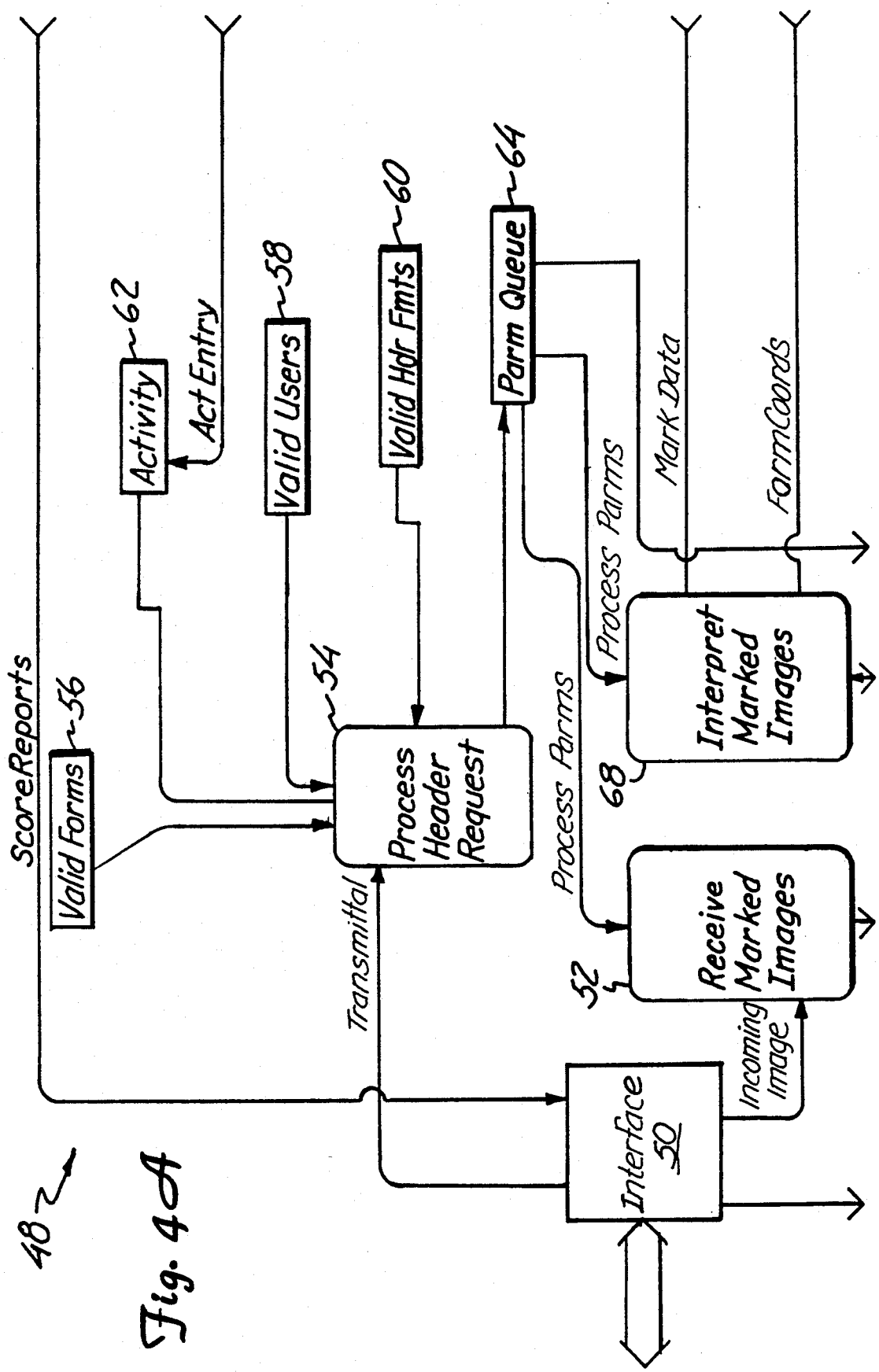
FIGS. 4A through 4D show a detailed flow chart which includes various subsystems of the present invention.

Process Header Request subsystem 54 shown in FIG. 4A maintains a set of valid header formats. Headers may be encrypted, and an intervening decode process (subsystem 66) will decode a header based on a preceding digital signature. A valid header is used to initialize a set of semaphores to which define the processes to perform to either data in the current transmission, or data in the next transmission. In many cases, in it possible to integrate the header into the actual mark-form or image transport. The header processor places a header interpretation series into parameter queue 64 which facilitates triggering of subsystem processes. In the event that a header interpretation fails, either due to an unrecognized header or because the type of header and the request are inconsistent with the elements within the domain of the processor or those elements authorized for the sender, the request is rejected and the rejection is logged. If the sender is a valid subscriber, a rejection message is returned.

The following are examples of headers which may be incorporated into the transmission:

Assessment Header: This header defines that subsequent data is to be processed as elements of an assessment; a new assessment, a key, or assessments for scoring/evaluation. This header contains information describing the sender, the subject, identifies the assessment, and specifies the choice for disposition of the results.

Quantitative Header: This header indicates that the subsequent data is to be processed as quantitative for applications such as order entry, inventory, etc. The header contains information describing the association of the subsequent data with an interpretation algorithm, and specifies disposition instructions.

Routing Header: This header identifies the subsequent data as having a destination and contains information required for the routing processor to complete a routing request. This header is used for directing data to the respective destination on a computer network which may be connected to computer 12. The destination is typically a user who is identified by User Id with optional elements such as node, location, etc. The destination may also be a virtual machine or database acting as a repository for these data.

Command Header: This header identifies that the subsequent data is process control instructions and is to be passed to the specified instruction queue for processing. This header is used in applications in which a facsimile transmission will enable certain remote processes; potential applications are industrial process, home computer process direction, batch request, etc.

Decrypt Transmittal subsystem 66 is triggered by the supervisor when Process Header Request subsystem 54 recognizes a SECURE parameter in the header transmission. The decoding is conducted according to the respective encryption formats using the appropriate key. Prior to decoding, Decrypt subsystem 66 in FIG. 4C produces run-length encoded bit maps. Decrypt subsystem 66 then converts the bit map to one useable by the Interpret Marked Images subsystem 68.

Interpret Marked Image subsystem 68 in FIG. 4A performs a mark vector analysis on the bitstream if appropriate. The mark vector analysis is performed according to criteria derived from elements of the parameter record produced by the respective header processor. One of these parameters may be an index to a set of form coordinates to be interrogated during this phase. One exception being the Learn Form subsystem 78 which determines the location of all possible valid marks on the form. Mark identification is performed according to optical field density equations which are able to base identity thresholds on factors of the equations. These equations equate an area of density to the slope of density. This is able to arrive at edges and sizes as well as actual densities of marks. Knowing the mark limits in advance, it is no longer necessary to completely obliterate a mark field as is required by prior art mark sense scanning devices. In this way, it is possible to generate "attempt" or "erasure" statistics based on fluctuations in background image acuity. The results of the mark vector analysis are then placed in a transient data queue for subsequent processing.

Mark vectors are processed with the following subsystems:

(1) Associate/Score Marks subsystem 80. This subsystem processes the main vector analysis according to an associated equivalence key, producing a set of results which are stored in a database record indexed by subject, assessment, and source.

(2) Learn Form subsystem 78. This subsystem builds the form coordinates that will be used by the mark vector analysis.

(3) Build Key subsystem 74. This subsystem creates an answer key record for use by subsequent score marks processes. The key is a set of vectors which represent correct answers. This is only appropriate when the assessment is linear, although the keys processor has the ability to perform inference processing. Inference processing criteria are unable to be transmitted effectively by facsimile owing to the complexity of the marking model that would be required. Such inference criteria are entered in on-line sessions.

Figure 4B:
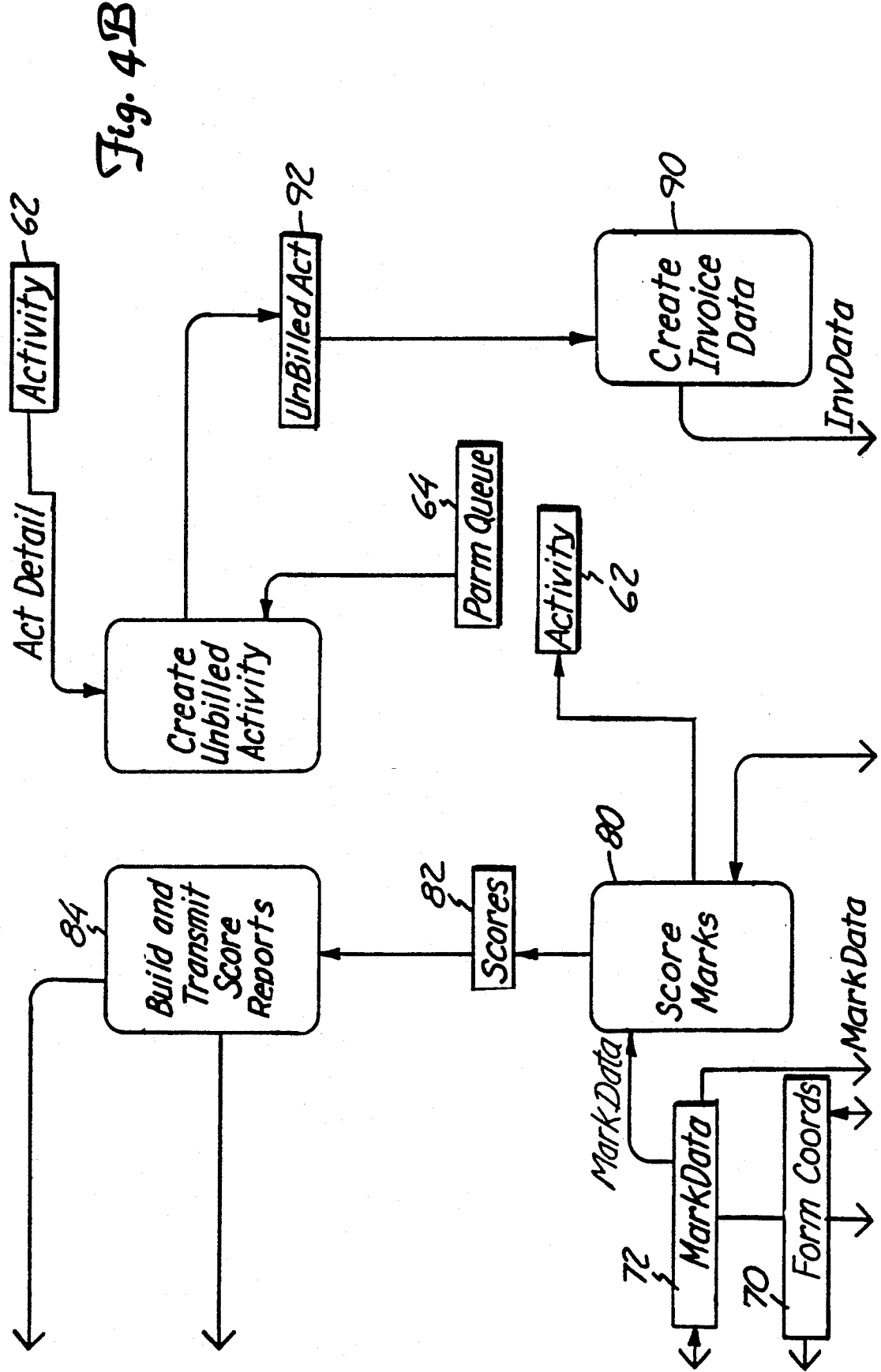
Figure 4C:
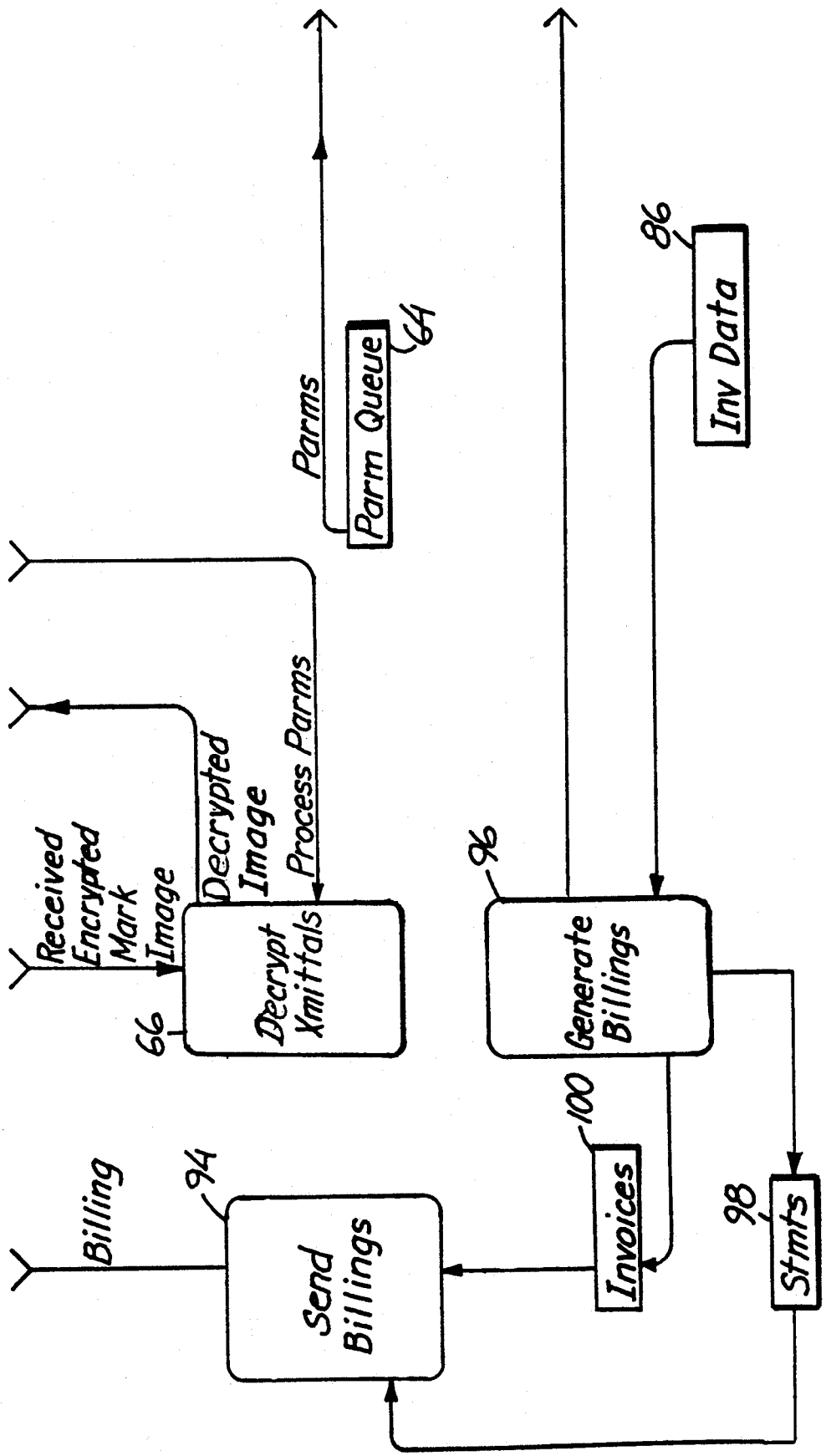
Figure 4D:
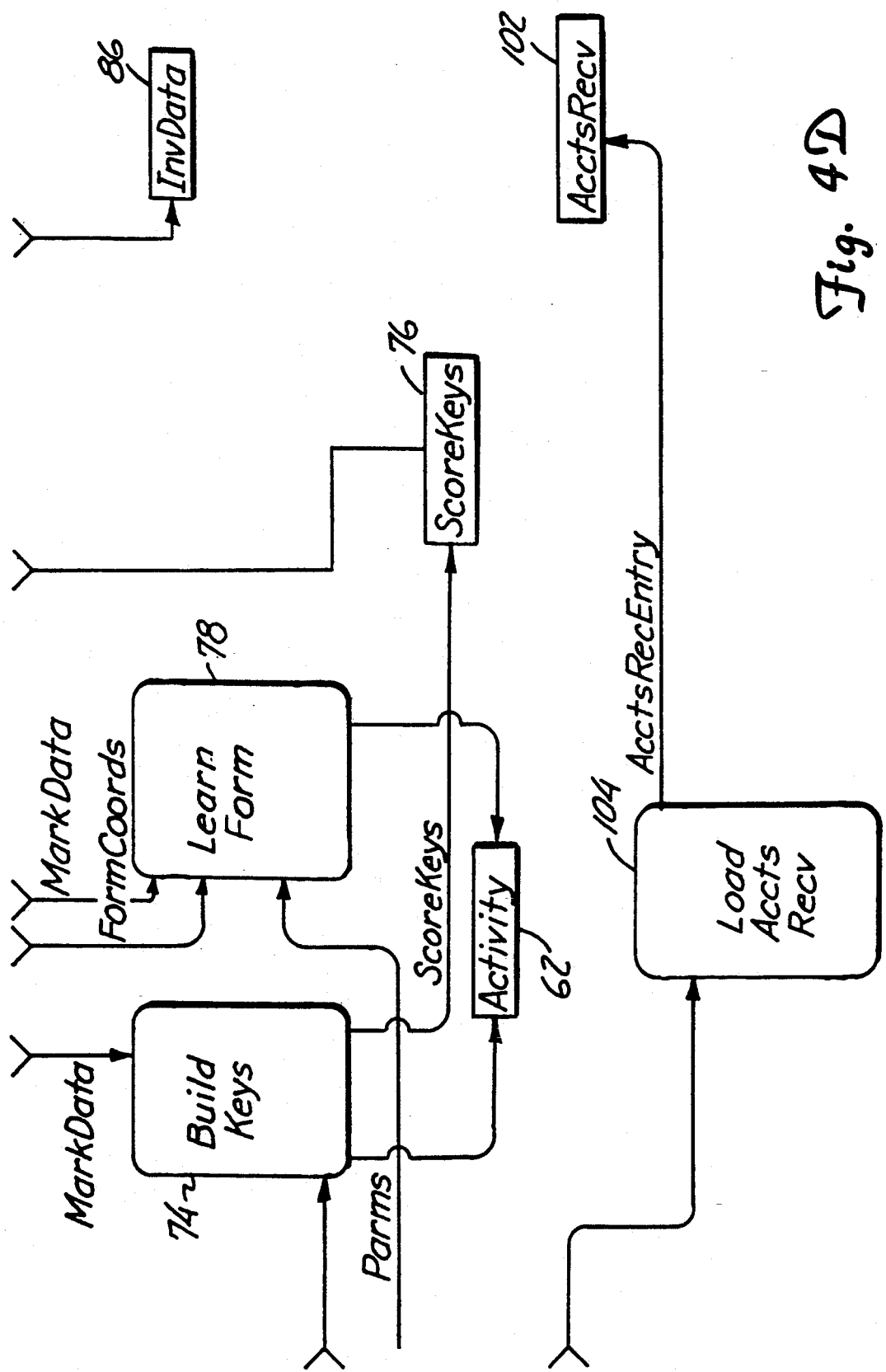

In Build and Transmit Score Reports subsystem shown in FIG. 4B, depending on the parameters set forth during header processing, the processor creates responses and then transmits them. This transmission is either a return facsimile containing results, or is a data transmission occurring over a network or conventional data transmission medium as would potentially be the case with order entry, inventory, routing, command, or even certain permutations of scoring processes.

Mark vector analysis is based on a need to analyze images in a manner in which facsimiles can be analyzed; either using known attributes, or to derive attributes for later comparative analysis or recognition. The processes described herein assume (1) that within the domain of pixels contained within an image boundary or image segment boundary lie pixels that are deliberately set by the facsimile process at known or derived coordinates, and (2) that the nature of the technology may produce artifacts which could cause false interpretations. The analysis and interpretation process accounts for (1) the ability to recognize image elements using a vectorized set of interpretation functions; (2) to analyze an image, and subsequently catalog a set of serialized image elements; and (3) to provide for constant attenuation of input signals to filter unwanted artifacts and/or increase the discretion of component detection/identification.

Within the bounds of an image or image component are possibly an infinite number of domains. However, there are assumed a finite number of practical domains that lie between the least and greatest vectors as referenced from the image facsimile origin. Although images are in fact representative of real domains, their facsimiles are actually integral domains as there is a certain resolution to the facsimile reproduction and that resolution is represented using a whole number of resolution representatives (or pixels) per unit (typically an inch; e.g. 200 dpi). Thus, a graphical facsimile reproduction is composed of finite image units (pixels) which represent a given space (recording density or resolution). Only physical dithering produces "true" pixels to represent an image unit that spans a physical scan line which is one pixel high. Physical dithering is a form of alternate or 'smoothed' rounding which resolves real space using a skew in 45 degree regions to attempt representation of non-linear image components. For example, a line on an original 1/200th of an inch wide would be represented by a single row of pixels at 200 pixel per inch recording density. A line whose center is at 1.5 inches would then be represented by facsimile at either row 300 or row 301 via dithering; e.g. approximation.

An image component, for the purpose of this process, is a set of associated image "atoms" (or pixels) which establish a circular set of references (which are one or more conic sections or polygons) or a continuous line or set of linear segments.

Darkness of a specific image component is defined as a set of "on" pixels, and raw density of a "spacial" set is derived using a sum of the "on" pixels within the area bounded by the space dictated by one or more vector equations. Density slew is the value added to or subtracted from this sum thus creating "real" or "net" density. In this way, various forms of negative and/or positive artifacts are accounted for.

This invention, using registers represented as vector equations, either combines with functional or multifunctional truth tests, which are associated by linked-lists, to create representative conclusions, or creates functional or multifunctional truths which yield dependent or independent maps or catalogues of serialized image components. In a raw analysis, that is without a predisposition for specific image components, the objective is to isolate and identify discrete or continuous image components; e.g. shapes or lines respectively. The processes are governed by a fragment threshold representing an integral fraction or represented by an average of many fractions, of resolution. This is based on the need to attenuate the definition of continuous lines and tight shapes being bounded by whitespace which exceed the fragment threshold; thus lines are continuous and/or tight shapes are contiguous within a set of adjacent or nearly adjacent pixels within the fragment threshold. This threshold then defines when the decision is made to identify where one shape or line ends and another may begin.

In manual analysis of image data represented on a pixel map or form of grid overlay to render an image into integral units, identification, serialization, or cataloging of image components, would be performed using a form of dichotomous key. This key is essentially a set of vectors which direct the analyst to image coordinates which have a corresponding set of key coordinates on which evaluation is based. These vectors become sets of linked lists with associated functions or linear equations, whose results govern both the evaluation and navigation of the key.

This present invention is capable of extracting image objects from an incoming image. These objects are in two forms: (1) pixel-mapped images in mono or polyplanar format(s), e.g., graphics, or (2) textual image comprised of symbols of alphabets. The purpose of this process is to isolate image components, and then compare them with known elements for identification and/or classification.

The process is as follows:
(1) Isolate the first (or next) image component and place it in a rectangular frame, whose base is the lower left corner and is regarded as component-relative-coordinate 0,0.
(2) Perform a pre-frame analysis to determine if the component contains a fundamental shape, e.g., line, rectangle, conic section, etc. If it does, record the shape family prior to inquiry against the catalog of known vectors.
(3) Based on the accuracy, scaling, orientation and aspect settings, compare the contents of the current frame with the elements of the known vector database. Comparison is performed between vectors of the sample with vectors in the database. This is accomplished through (1) one or more linear or multilinear regressions. These regression origins are adjusted using confidence intervals to adjust for origin framing, scaling, orientation, etc. This requires that the subject and the object to be reasonably similar; (2) by comparing a detected set of transition states with a number of known sets of transition states (e.g., pen locate (X,Y), pen down, line draw $(X+N_x, Y+N_y)$, pen-up, stop); or (3) by comparing sets of polynomials of degree N within a given resolution. For example, a sinusoidal line of 300 points with a resolution of 1 would produce a polynomial of degree 300. For this reason, there is a "view portal" representing a polynomial wherein an image segment is represented by a polynomial. Although the generalized curve-fitting "frame size" is arbitrary, this setting is most efficient when encompassing as many data points as possible. Such is the case when dealing with unit circle, conic section, or rectangular objects where a single equation may represent nearly an infinite set of data points.

The present invention uses a facsimile data stream, acquired either from magnetic media or a communications architecture; e.g. fax board, modem, network protocol, or similar data link. Once the data stream is acquired, the process proceeds, in one or both fashions, as follows:

(1) Case of data stream of presumably known and identified or vet to be identified vectors.

The image is converted to a bit map based on the definition header of the datastream, which indicates the digital signature type, recording density, compression factor(s), aspect ratios (X & Y), number of planes, etc. Given a vector map or set of vector maps, either the image identity is verified based on one or more base identifiers which are scalable vectors which establish identity as well as scaling, skewness, and acuity factors which are preserved for subsequent analysis functions, or the image identity is established by iteratively testing a sequential list of "possibility" sets of base identifiers with the scaling, skewness, and acuity factors preserved as before.

Once the image identity has been established, a vector to an analytical instruction set is established as a result. The first (and perhaps only) function is performed using its respective image vectors, process specifiers, and attenuators. Potentially, an unlimited number of functions are performed according to either the original (or default) order, or the order as dictated by the functions themselves. Navigation of this order is in accordance to a set of address vectors that operate like a dichotomous key, yet unlike a dichotomous key are automatically variable and adjusted in real-time. The results of the processes performed by the functions are returned in the form of a results list which may be logically AND'd and/or OR'd together based on the attributes of the functions themselves.

The results of one or the sum or the partial sum (or logical combination thereof) of these results are either stored and/or conveyed to slave or other processes, or are used to spawn further and potentially continuous analysis.

2. Case of data stream of unknown identity or content for component analysis/serialization.

The image is converted to a bit map based on the definition header of the datastream, which indicates the digital signature type, recording density, compression factor(s), aspect ratios, number of planes, etc.

The base image processor function set is engaged whose task is to isolate and serialize (or catalog) image components according to the governing parameters set forth to the base image processor. During this process, first the image is analyzed with each component, after identified, being catalogued, isolated, and eliminated from the image map. These image components are reduced to appropriate vector equations where possible and/or are stored or supplemented by compressed image maps. Next, again according to its parameters, the various images are associated as "bounded by", "contained in" "adjacent to", etc.

Note that while the number and/or variability of the vector functions employed in the analysis may approach infinity, an underlying concept of the present invention is to link vector processing of image data to image vectors which automatically translate into instruction vectors without prior knowledge of the actual image contents. In other words, analysis of the image and resultant processing is controlled and/or conditioned by the image itself. In a sense, this could be regarded as a form of optical programming (e.g. the image is the stimuli for process control), beyond being a massive image "fractionalizer" that isolates and classifies discrete image components. It must also be realized that the scope of the present invention includes variations on the functions that perform the image processing.

Conversion of the bit map image into a vector representation comprises a number of steps. An object classification pass is performed. First, rows of the image are decomposed according to an image polarity variable whereby pixels are either left unchanged or inverted. The image is scanned row by row and blank rows in the image are marked. Column scanning begins on the first non blank row with the first non blank pixel referenced as image object n. Vectors are produced representative of edges of an object. Next, vectors are produced which represent any remainder of the object, unless the object is filled at or above a fill threshold. This continues until there are no longer any adjacent "on" pixel elements.

The present invention creates a vector map in which the vector elements are reduced to their simplest form. In one embodiment these vectors are: a circle, a conic section, a line, a rectangle, a polygon and a multimodel sine wave. If a vector cannot be reduced, a raw vector map is used for that object.

The system records all vector elements contained in the image in a vector catalog of image component vectors.

Figure 5:
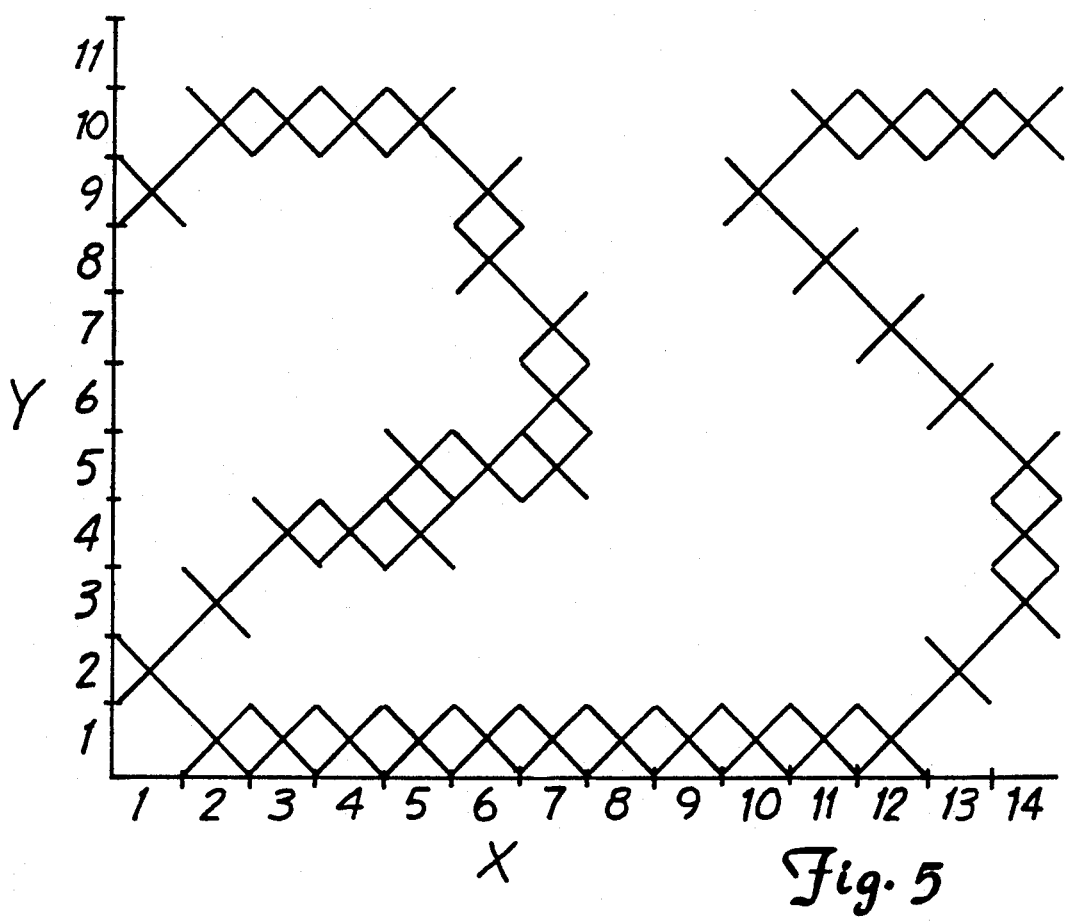
FIG. 5 shows an example of a bit map image.

FIG. 5 illustrates a conversion of a bit map image into a vector representation in accordance with the present invention. Table 1 shows a vector representation of the pixel image shown in FIG. 5. The vector representation of Table 1 is a very simple vector representation in which only linear vector elements extending in the X direction are used.

TABLE I

| Y | X Start | End | Start | End |
|---|-------|-----|-------|-----|
| 1 | 2 | 12 | | |
| 2 | 1 | 1 | 13 | 13 |
| 3 | 2 | 2 | 14 | 14 |
| 4 | 3 | 5 | 14 | 15 |
| 5 | 6 | 8 | 14 | 14 |
| 6 | 8 | 13 | | |
| 7 | 8 | 12 | | |
| 8 | 7 | 11 | | |
| 9 | 1 | 7 | 10 | 10 |
| 10 | 2 | 6 | 11 | 14 |

Other, more complex vectors can be used to represent circles, ellipses, circular segments, elliptical segments, hyperbolas, parabolas, hexagons, octagons, trapezoids, rhombi, pentagons, polygons, and lines. The more vector representations which are used, the more compressed the vector representation becomes.

In a preferred embodiment of the present invention, vector structures comprise line, rectangle, circle/ellipse and other. These are formed according to the following structure tables:

| STRUCTURES | |
|---|---|
| LINE | |
| 0. Vector Family=1 | Stores style of shape that this vector locates. |
| 1. SLOPE | The slope ($\Delta Y/\Delta X$) for this vector. |
| 2. Intercept | The X intercept. |
| 3. max. X | The maximum X to use in |

-continued
STRUCTURES

| | | |
|---|---|---|
| 4. max. Y | | The maximum Y to use in search/scan. |
| 5. base X | | Origin (X), same as intercept. |
| 6. base Y | | Origin (Y). |
| 7. Next X | | Next shape X. |
| 8. Next Y | | Next shape Y. |
| 9. Weight | | Weight of object (0=solid). |
| 10. Scaling | | Scaling (percent of original size). |
| 11. Residual (Cx) | | Convexity. |
| 12. Offset (ProcTable) | | Procedure offset for processing (optional). |
| 13. Aspect Ratio (X/Y) | | Ratio of X to Y resolution. (e.g. 200/640) |
| Rectangle | | |
| 0. Vector Family=2 | | Stores style of shape that this vector locates. |
| 1. Not used | | n/a |
| 2. Not used | | n/a |
| 3. Size_X | | Width. |
| 4. Size_Y | | Height. |
| 5. base_X | | Origin (Left (+) or Right (−)). |
| 6. base_Y | | Origin (Lower (+) or Upper (−)). |
| 7. Next X | | Offset from equator to next equator. |
| 8. Next Y | | Offset from axis to next axis. |
| 9. Weight | | Trigger base density. (0=area) |
| 10. Scaling | | Scaling. (percent of original size) |
| 11. Not used | | n/a |
| 12. Offset | | Procedure offset (optional). |
| 13. Aspect Ratio | | X/Y resolution. (e.g. 200/640) |
| CIRCLE/ELLIPSE | | |
| 0. Vector Family=3 | | Stores style of shape that this vector locates. |
| 1. Not used | | n/a |
| 2. Orientation_radians | | Orientation in radians. |
| 3. radius$_1$ | | Radius. |
| 4. radius$_2$ | | Radius. |
| 5. base X | | Origin (center). |
| 6. base Y | | Origin (center). |
| 7. Next X | | Offset to next center. |
| 8. Next Y | | Offset to next center. |
| 9. Weight | | Trigger base (0=solid). |
| 10. Scaling | | Percent of stated size. |
| 11. Not used | | n/a |
| 12. Offset | | Procedure offset (optional). |
| 13. Aspect Ration | | Ratio X/Y. |
| OTHER | | |
| 0. Vector Family=4 | | Stores style of shape that this vector locates. |
| 1. Vector shape Id | | Identification of 'other' type vector. |
| 2. Not used | | n/a |
| 3. Not used | | n/a |
| 4. Not used | | n/a |
| 5. base X | | First X. |
| 6. base Y | | Y of first X. |
| 7. Next X | | Next base X. |
| 8. Next Y | | Next base Y. |
| 9. Weight | | Width of edge; 0=solid. |
| 10. Scaling | | Aspect ratio. |
| 11. Not used | | n/a |
| 12. Offset | | Procedure offset (map), required. |
| 13. Aspect Ratio | | Ratio X/Y. |

Additional vectors may be included to optimize the system for different types of images.

The present invention inherently provides data compression of an image. This is achieved because typically a vector definition which defines a path between two points along with shading information will require less information than the information necessary to identify each individual pixel which lies on that vector and in the area defined by that vector.

Figure 6:
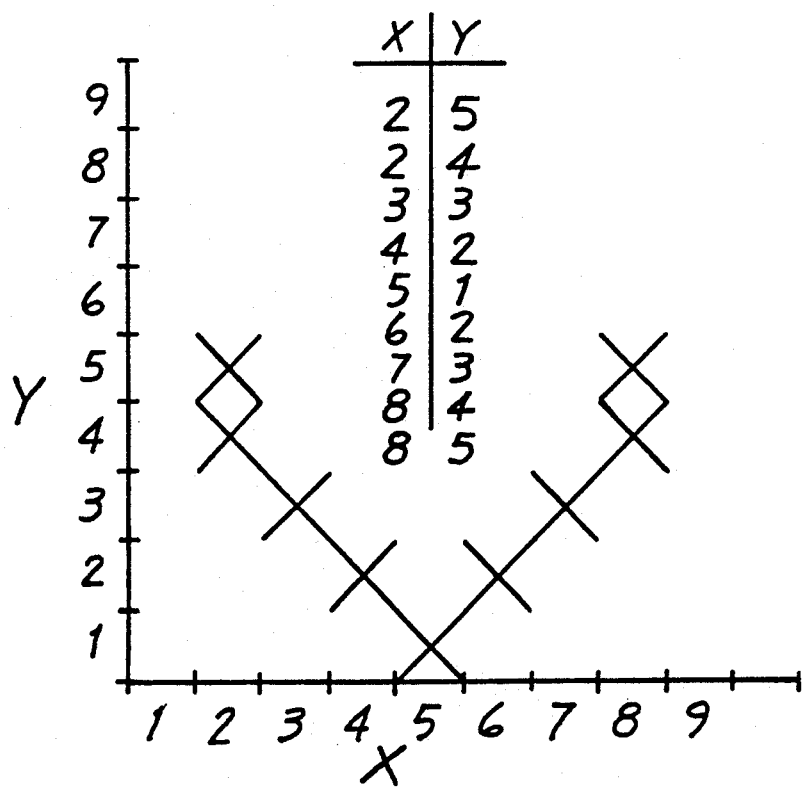
FIG. 6 shows an example of a bit map image.

FIG. 6 illustrates conversion of a bit map image to vector components of the present invention. FIG. 6 shows a total of 9 pixel elements which form a 'V' shape. The image in FIG. 6 is formed using pixels (X, Y): 2,5; 2,4; 3,3; 4,2; 5,1; 6,2; 7,3; 8,4; and 8,5. The present invention converts the bit map image into a vector representation. The image of FIG. 6 can be reduced to four line vectors: 5,1–2,4; 2,4–2,5; 5,1–8,4; 8,4–8,5.

After an image is converted into a vector representation, the vector equations can be operated upon, in accordance with the present invention. The vector representations can be compared with known vector representations and results from this comparison can be output. The vector representation can be compared with a previously learned form. In this case, markings in the vector representation can be identified and the marks interpreted. Comparison of a vector representation of an image with known vector representation is through a set of combinant linear regressions of the vector equations or by calculating density sums.

This approach differs significantly from prior art systems which use matrices of pixel coordinates in which varying inversion and sum equations produce "likeness" quotients.

In the present invention, the number of underlying analytical functions and equation processes is practically unlimited. The present invention is able to derive a set of assumptions regarding a bit map image after performing a learning process whereby subsequently input bit map images are compared with the learned image.

Known images are analyzed using the following program steps:

```
Analyze Known Image (Create Form Vector Analysis)
Load vector map
While there are more objects
    get object coordinates {object-ptr}
        locate object coordinates
        while ok_to_test
            perform_object_test_location
            if test_result_ok push result value
                push result type
                increment test_ctr
                if test_ctr > test_limit
                    break
                vary object coordinates
                iterate
        end while
    increment object_ptr
    iterate
end while.
Interpret Image
Get Results_of_Analyze with Result_Id (Job Seq. No.)
    as stream
Get Equivalence_Map with Equiv_Map_Id
    as look-up
While (Get=Equivalence object= = =is_OK)
    While (There_are_more)
        if result = = Equiv-Return Value
            push Equiv_Data to INTER P_STACK
        Increment Equivalents
        iterate
    and while
    increment Object_ptr
end while
```

-continued

```
signal Msg. Queue.
```

The interpretation is output or acted upon using the following steps:

```
Output (or act on) Interpretation
    Get Output_Vector from PARM_REC
    Get Interp_Stack_Id from Interp_Stack_Table
    Initialize Output_Vector
    While Elements_in_Stack_Remain
        Pass Stack_Element to Output_Vector
        Increment Stack_ptr
        Iterate
    end while
    Close Output_Vector
    Log Activity
    Sleep.
```

Each Facsimile image includes a header which is processed using the following steps:

Process Header (1) Check for open items in the incoming queue. If any found:
 a) Check caller id against alt key (FAX_PH_NO) in the client table If found, place a SIGNAL message in the message queue.
 else;
 Log an unknown caller.
 else wait for incoming.
(2) Compress the incoming image file and make an appropriate entry in the queue catalog.
(3) If signalled, attempt to determine the header identity:
 a. Check for a default/master header if check fails, continue, else break
 b. While there are more headers to check, check headers. If checks fail, make a header Id fault entry in the error log and exit process_header.
(4) Queue the header id & image id.
(5) Queue the header page to the transient data
(6) Decode the header page. If there are any errors, load a header decode fault in the error log and exit process header.
(7) Get a job sequence number and combine it with header and client data, place in the parm queue and a SIGNAL entry in the message queue.
(8) Exit Process_Header.

The present invention provides a novel method and apparatus for processing images in an image processing system. The present invention converts a bit map image into a vector representation of the image. This provides improved capabilities over prior art image processing systems. The image processing system of the present invention includes mark sense analysis of images which may be received from a facsimile machine. For mark sense analysis, the present invention learns the format of a form, learns a key for that form and scores marked forms by comparing marked forms with the key based upon the learned form. The results of this comparison may be sent to a subscriber. Activity is recorded so that subscribers may be billed for services.

Although the present invention has been described with reference to preferred embodiments, workers skilled in the art will recognize that changes may be made in form and detail without departing from the spirit and scope of the invention. For example, the present invention may be used with numerous vectors and vector equations.

What is claimed is:

1. An image processing system for recognizing and interpreting scanned images, comprising:
 a facsimile scanner for receiving an optically scanned image and providing an image output representative of a bit map of the image, the facsimile scanner including a connection for connecting to an image source and an optical scanner for optically scanning images;
 a memory for storing image related information;
 learn form means coupled to the facsimile scanner and the memory for producing a learned form by receiving the image output, learning positional information relating to acceptable mark positions and storing the learned form in the memory;
 build key means coupled to the facsimile scanner and the memory for building a key by receiving the image output, correlating mark information in the image output with the learned form and storing the key in the memory;
 score marks means coupled to the facsimile scanner and the memory for interpreting marked images in the image output by comparing marked images with the key and the learned form and providing a score output related to the comparison; and
 output means for outputting the score output.

2. The image processing system of claim 1 including means for receiving the image output representative of a bit map of the image and converting the image output into a vector representation of the image.

3. The image processing system of claim 2 wherein the means for converting converts the image output into vectors represented by lines.

4. The image processing system of claim 2 wherein the means for converting converts the image output into vectors represented by rectangles.

5. The image processing system of claim 2 wherein the means for converting converts the image output into vectors represented by conic sections.

6. The image processing system of claim 1 including means coupled to the learn form means, the build key means and the score means, for accounting for services rendered and generating a customer bill based upon system activity.

7. The image processing system of claim 1 wherein the output means transmits the score output over the telephone connection.

8. The image processing system of claim 1 including means coupled to the facsimile scanner, for receiving header information representative of a user identification and command instructions.

9. The image processing system of claim 1 including means coupled to the facsimile scanner, for encrypting and decrypting information.

10. An apparatus for processing images comprising:
 means for receiving discrete pixel elements representative of a scanned image;
 means for converting the plurality of pixel elements into a vector representation which is representative of the scanned image;
 means for comparing the vector representation with known vector representations;
 means for providing an output based upon the comparison of the vector representation with known vector representations; and said means for comparing provides an interpreted output representative of a comparison between a marked form and an interpretation key.

11. The apparatus of claim 10 wherein the means for converting converts the pixel elements to a vector representation which comprises lines.

12. The apparatus of claim 10 wherein the means for converting converts the pixel elements to a vector representation which comprises rectangles.

13. The apparatus of claim 10 wherein the means for converting converts the pixel elements to a vector representation which comprises conic sections.

14. The apparatus of claim 10 wherein the means for receiving discrete pixel elements comprises a facsimile scanner.

15. The apparatus of claim 10 including means coupled to the means for receiving, for decrypting information.

16. An apparatus for analyzing images comprising:
means for receiving discrete pixel elements representative of a scanned image;
means for converting the plurality of pixel elements into a vector representation which is representative of the scanned image;
means for comparing the vector representation with known vector representations;
means for providing an output based upon the comparison of the vector representation with known vector representations; and
said means for providing an output comprises a facsimile scanner for providing an output over a telephone connection.

17. An apparatus for analyzing images comprising:
means for receiving discrete pixel elements representative of a scanned image;
means for converting the plurality of pixel elements into a vector representation which is representative of the scanned image;
means for comparing the vector representation with known vector representations;
means for providing an output based upon the comparison of the vector representation with known vector representations; and
said means for providing an output comprises a printer.

18. An apparatus for analyzing images comprising:
means for receiving discrete pixel elements representative of a scanned image;
means for converting the plurality of pixel elements into a vector representation which is representative of the scanned image;
means for comparing the vector representation with known vector representations;
means for providing an output based upon the comparison of the vector representation with known vector representations; and
means coupled to the means for receiving, for processing a header which contains user identification information.

19. An apparatus for analyzing images comprising:
means for receiving discrete pixel elements representative of a scanned image;
means for converting the plurality of pixel elements into a vector representation which is representative of the scanned image;
means for comparing the vector representation with known vector representations;
means for providing an output based upon the comparison of the vector representation with known vector representations; and
said means for converting is responsive to image density whereby gray scale and color image information is included in the vector representation.

* * * * *